United States Patent
Ni et al.

(10) Patent No.: US 9,432,186 B2
(45) Date of Patent: Aug. 30, 2016

(54) PASSWORD-BASED KEY DERIVATION WITHOUT CHANGING KEY

(71) Applicant: MXTRAN INC., Hsin Chu (TW)

(72) Inventors: Wan-Sheng Ni, Taipei (TW); Huan-Chin Luo, Hsinchu County (TW); Shu-Ching Huang, New Taipei (TW); Fen-Ying Syu, New Taipei (TW)

(73) Assignee: MXTRAN INC., Hsin Chu (TW)

( * ) Notice: Subject to any disclaimer, the term of this patent is extended or adjusted under 35 U.S.C. 154(b) by 179 days.

(21) Appl. No.: 14/153,141

(22) Filed: Jan. 13, 2014

(65) Prior Publication Data

US 2015/0200777 A1    Jul. 16, 2015

(51) Int. Cl.
*H04L 9/08* (2006.01)
*G09C 1/00* (2006.01)

(52) U.S. Cl.
CPC ............... *H04L 9/0863* (2013.01); *G09C 1/00* (2013.01); *H04L 9/0869* (2013.01)

(58) Field of Classification Search
CPC ........................... H04L 9/0861–9/0869; H04L 63/083–63/0846; G06F 12/1408; G06F 21/31; G06F 21/602
See application file for complete search history.

(56) References Cited

U.S. PATENT DOCUMENTS

| | | |
|---|---|---|
| 2012/0144195 A1 | 6/2012 | Nair et al. |
| 2012/0170740 A1 | 7/2012 | Lee et al. |
| 2013/0315393 A1 | 11/2013 | Wang et al. |
| 2014/0281574 A1* | 9/2014 | Webb ................ G06F 21/74 713/189 |

FOREIGN PATENT DOCUMENTS

TW    201347594 A    11/2013

OTHER PUBLICATIONS

Kaliski, B. [RFC 2898] "PKCS #5: Password-Based Cryptography Specification", Version 2.0, Network Working Group. RSA Laboratories. Published: Sep. 2000. <http://www.rfc-editor.org/pdfrfc/rfc2898.txt.pdf>.*
TrueCrypt Foundation. "TrueCrypt User's Guide", version 4.2a. Published: Jul. 3, 2006.*
TIPO Office Action dated Nov. 13, 2015 in corresponding Taiwan application (No. 102149392).
TIPO Office Action dated Aug. 24, 2015 in corresponding Taiwan application (No. 102149392).

* cited by examiner

*Primary Examiner* — Evans Desrosiers
*Assistant Examiner* — Kevin Bechtel
(74) *Attorney, Agent, or Firm* — McClure, Qualey & Rodack, LLP (57) ABSTRACT

A data securing method, a data securing system and a data carrier are provided. The data securing method comprises an encryption procedure for encrypting a data or performing an authentication procedure. The encryption procedure includes the following steps. A first personal identification number is obtained. A first random number is generated. A first key is obtained according to the first personal identification number and the first random number. A first secure checksum is obtained according to the first key. The first random number and part of the first secure checksum are stored. The data is encrypted. The authentication procedure is performed according to the first key.

23 Claims, 8 Drawing Sheets

PASSWORD-BASED KEY DERIVATION WITHOUT CHANGING KEY

TECHNICAL FIELD

The disclosure relates in general to a data processing method, a data processing system and a data carrier, and more particularly to a data securing method, a data securing system and a data carrier.

BACKGROUND

Accompanying advancements in technologies, various digital data can be stored in a storage device. People may store or communicate confidential information in the storage device. Once the storage device is lost, the confidential information may be stolen.

Nowadays, the information security is more and more important. The storage device can store an encrypted data instead of the original data for preventing from stealing. If someone wants to take out the original data, it is needed to decrypt the encrypted data according a key. Once a hacker gets the key, he can take out the original data easily. Today, network and smart phone application programs are widely used. If the key is stored in the program or a non-volatile memory, the hacker or researcher can obtain the key. Therefore, how to keep the key in secret is a challenge in the information security.

SUMMARY

The disclosure is directed to a data securing method, a data securing system and a data carrier. A personal identification number and a key are not stored in the data carrier. Even if a hacker gets the data carrier, he cannot obtain the personal identification number and the key. Therefore, the encrypted data will not be decrypted by the hacker and the hacker cannot pass the authentication procedure.

According to one embodiment, a data securing method is provided. The data securing method comprises an encryption procedure for encrypting a data or performing an authentication procedure. The encryption procedure including the following steps. A first personal identification number is obtained. A first random number is generated. A first key is obtained according to the first personal identification number and the first random number. A first secure checksum is obtained according to the first key. The first random number and part of the first secure checksum are stored. The data is encrypted. The authentication procedure is performed according to the first key.

According to another embodiment, a data securing system is provided. The data securing system comprises an inputting unit, a random number generating unit, a key generating unit, and a storage unit. The inputting unit is for inputting a first personal identification number. The random number generating unit is for generating a first random number. The key generating unit is for obtaining a first key according to the first personal identification number and the first random number. The storage unit is for storing the first random number.

According to an alternative embodiment, a data carrier is provided. The data carrier is for storing and encrypting a data. A first secure checksum is obtained according to a first key. The data is encrypted according to the first key. The data carrier comprises a storage unit. The storage unit is for storing a first random number, part of the first secure checksum and the encrypted data. The first key is obtained according to a first personal identification number and the first random number.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Preferred embodiments are disclosed below for elaborating the invention. A personal identification number and a key are not stored in the data carrier. Even if a hacker gets the data carrier, he cannot know the personal identification number or the key. Therefore, the encrypted data will not be decrypted by the hacker. The following embodiments are for the purpose of elaboration only, not for limiting the scope of protection of the invention. Besides, secondary elements are omitted in the following embodiments to highlight the technical features of the invention.

Figure 1A:
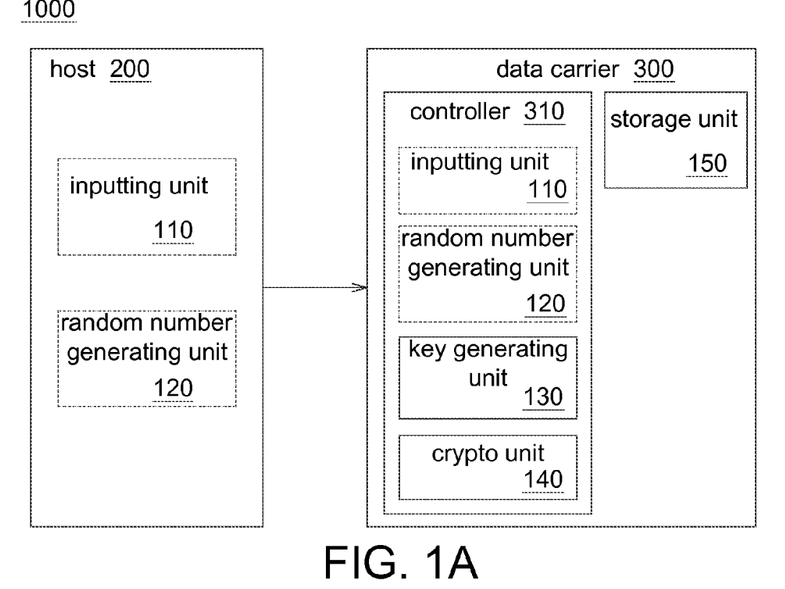
FIG. 1A shows an architecture of a data securing system.

Please referring to FIG. 1A, FIG. 1A shows an architecture of a data securing system 1000. The data securing system 1000 is used for encrypting a data or decrypting the encrypted data. The data securing system 1000 includes an inputting unit 110, a random number generating unit 120, a key generating unit 130, a crypto unit 140 and a storage unit 150.

The inputting unit 110 is used for inputting varied data or information by a user. For example, the inputting unit 110 can be a touch panel, a keyboard, a scanner, a communication line connected to an inputting device, or a circuit having a function for receiving varied data or information.

The random number generating unit 120 is used for generating a random number. For example, the random number generating unit 120 can be a chip, a circuit board having a program firmware, a storage medium storing a plurality of program codes, or a circuit having a function for generating a random number.

The key generating unit 130 is used for obtaining a key by performing an algorithm. For example, the key generating unit 130 can be a chip, a circuit board having a program firmware, a storage medium storing a plurality of program codes, or a circuit having a function for obtaining a key.

The crypto unit 140 is used for encrypting, decrypting or verifying data. The crypto unit 140 performs an authentication procedure according to a first key KEY1. For example, the server and the user or the APP and the NFC SE can performs the authentication procedure to verify whether the first key KEY1 is correct or not. For example, the crypto unit 140 can be a chip, a circuit board having a program firmware, a storage medium storing a plurality of program codes, or a circuit having a function for encrypting, decrypting or verifying data.

The storage unit 150 is used for storing varied data. For example, the storage unit 150 can be a memory, a register or a hard disk.

In FIG. 1A, the inputting unit 110 and the random number generating unit 120 can be configured in a host 200 or a controller 310 of a data carrier 300. The key generating unit 130, the crypto unit 140 can be configured in the controller 310 of the data carrier 300. For example, the host 200 can be a smart phone, a tablet computer, a desktop computer, or a server computer. The data carrier 300 can be a USB disk, a portable hard disk, or a memory card.

Figure 1B:
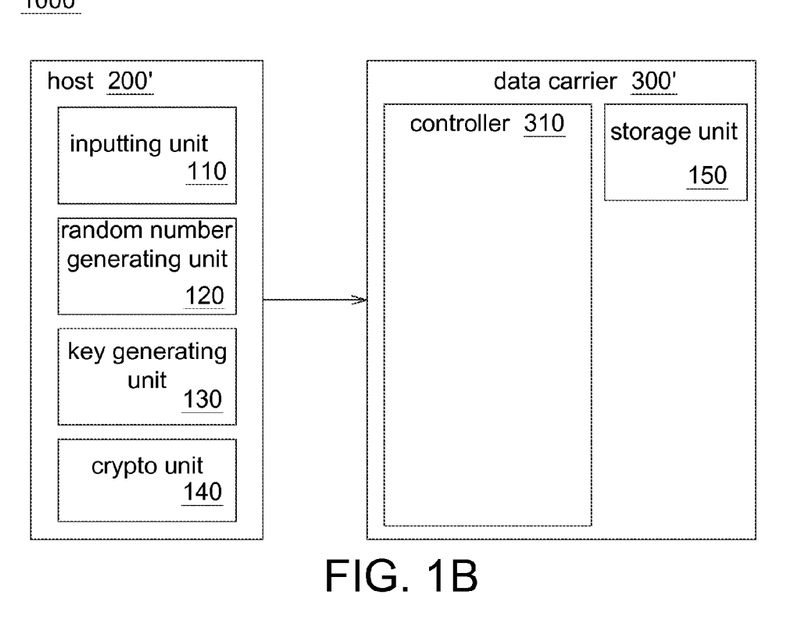
FIG. 1B shows an architecture of another data securing system.

Please referring to FIG. 1B, FIG. 1B shows an architecture of another data securing system 1000'. In another embodiment, the inputting unit 110, the random number generating unit 120, the key generating unit 130 and the crypto unit 140 can be configured in a host 200'. The storage unit 150 can be configured in a data carrier 300'. That is to say, the inputting unit 110, the random number generating unit 120, the key generating unit 130 and the crypto unit 140 can be configured in a host, such as the host 200 of FIG. 1A, or in a data carrier, such as the data carrier 300' of FIG. 1B.

Figure 1C:
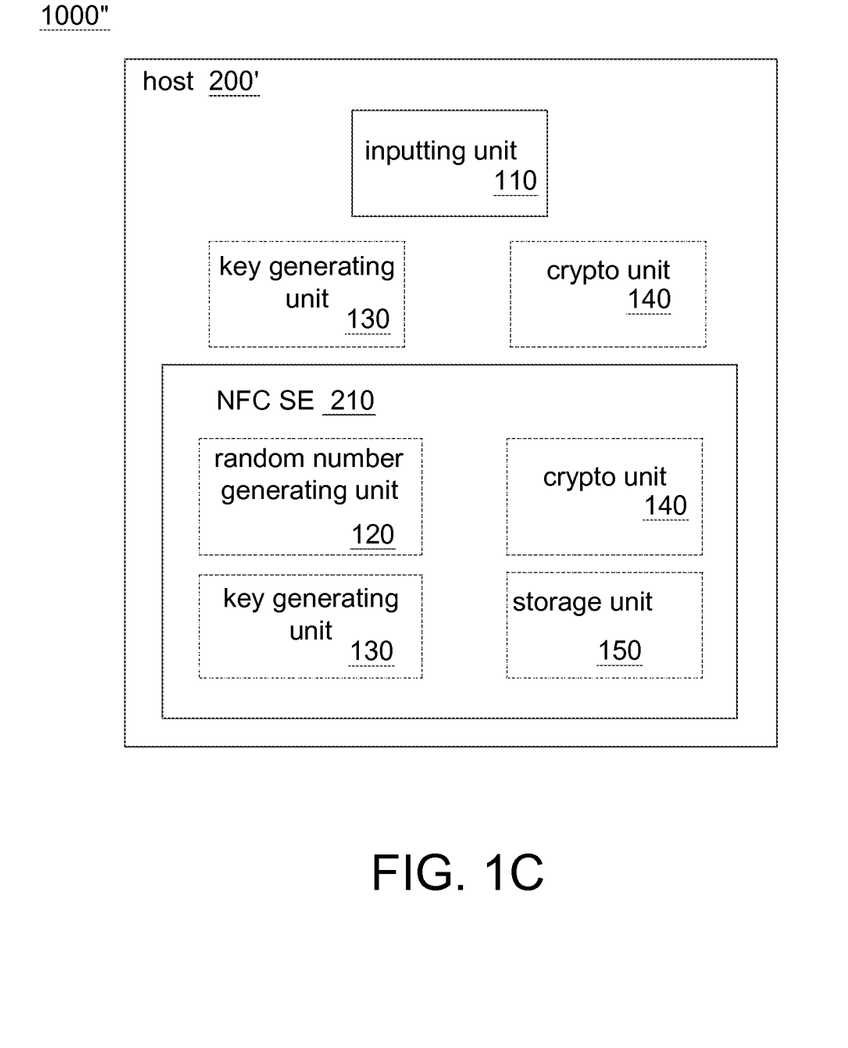
FIG. 1C shows an architecture of another data securing system.

Please referring to FIG. 1O, FIG. 1O shows an architecture of another data securing system 1000". In another embodiment, the random number generating unit 120, the key generating unit 130, the crypto unit 140 and the storage unit 150 can be configured in a near field communication secure element (NFC SE) 210.

The invention is not limited to FIGS. 1A to 1C. For example, the crypto unit 140 can be configured in the data carrier 300, 300' or the host 200, 200'. The algorithm performed in the crypto unit 140 is not limited to be stored in a device where the crypto unit 140 is configured. The algorithm performed in the crypto unit 140 can be stored in the host 200, 200' or the data carrier 300, 300'.

On the other hand, the algorithm performed in the key generating unit 130 is not limited to be stored in a device where the key generating unit 130 is configured. The algorithm performed in the key generating unit 130 can be stored in the host 200, 200' or the data carrier 300, 300'.

The above elements of the data securing system 1000, 1000', 1000" are described with a data securing method in detail. The data securing method includes an encryption procedure, a decryption procedure and a personal identification number changing procedure.

Figure 2:
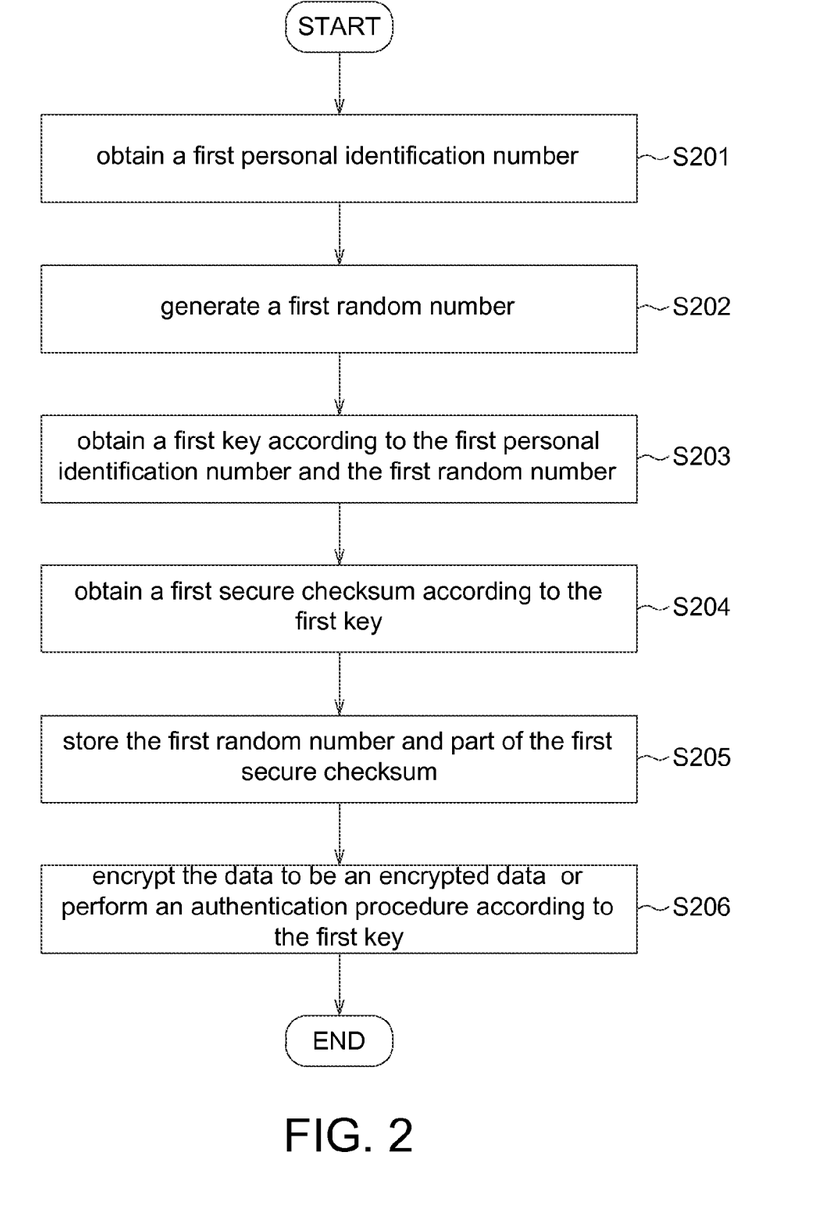
FIG. 2 shows a flow chart of the encryption procedure of the data securing method.
Figure 3:
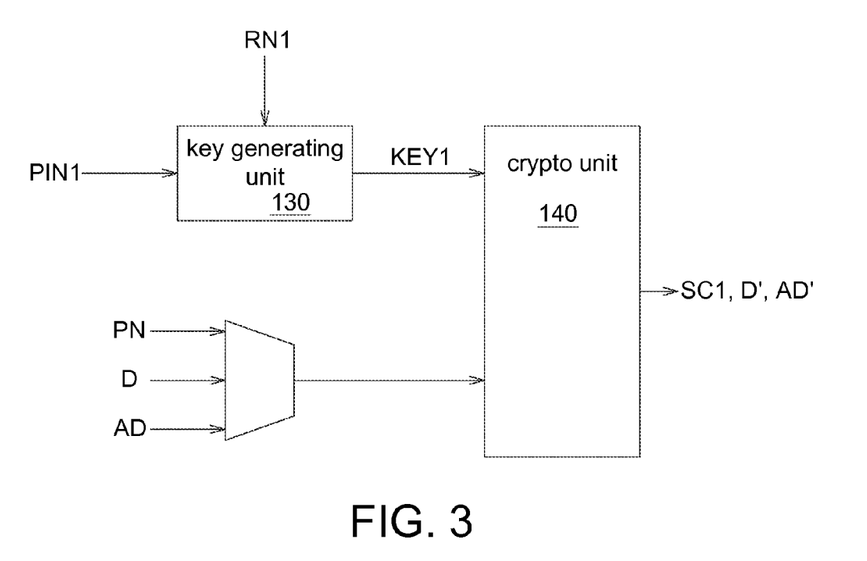
FIG. 3 shows a logic diagram of FIG. 2.

Please referring to FIGS. 2 and 3, FIG. 2 shows a flow chart of the encryption procedure of the data securing method, and FIG. 3 shows a logic diagram of FIG. 2. In step S201, the inputting unit 110 obtains a first personal identification number PIN1 from the user. The first personal identification number PIN1 can be inputted by keying in, by clicking a virtual keyboard having a random arrangement on a screen, or by scanning a one dimension bar code or a two dimension bar code. For example, the first personal identification number PIN1 is "0x3132333435363738393a3b3c3d3e3f30."

In step S202, the random number generating unit 120 generates a first random number RN1. The first random number RN1 can be stored in the storage unit 150 of the data carrier 300, 300' or be stored in a non-volatile memory of the host 200, 200'. For example, the first random number RN1 is "0xC4F87A6290AEE1ACFC1F26083974CE94." In step S202, the first random number RN1 can be generated by the host 200 or the data carrier 300 in FIG. 1A.

In step S203, the key generating unit 130 obtains a first key KEY1 according to the first personal identification number PIN1 and the first random number RN1. In step S203, the first key KEY1 can be obtained by performing a many-to-one algorithm or a one-to-one algorithm. The many-to-one algorithm may be an exclusive-OR operation. The one-to-one algorithm may be a linear function algorithm. Taking the exclusive-OR operation as an example, the first key KEY1 can be obtained by the following equation (1). After calculating, the first key KEY1 is "0xF5CA4956A598D694C5251D34044AF1A4.

$$PIN1 \oplus RN1 = KEY1 \quad (1)$$

In step S204, the crypto unit 140 obtains a first secure checksum SC1 according to the first key KEY1. In step S104, the first secure checksum SC1 can be obtained according to the first key KEY1 and a predetermined number PN, such as "0X00 . . . 00". The first secure checksum SC1 can be obtained by performing a many-to-one algorithm or a one-to-one algorithm. For example, the first secure checksum SC1 can be obtained by performing Hash algorithm, a symmetric encryption algorithm, an asymmetric algorithm or a CRC32 algorithm. For example, the first secure checksum SC1 can be obtained by the following equation (2) which is AES128 encrypting algorithm. After calculating, the first secure checksum SC1 is "0xED56716F3B78D8741758ED0B34E3A2DD."

$$SC1 = AES\_ENC(KEY1, PN) \quad (2)$$

In step S205, the first random number RN1 and part of the first secure checksum SC1 are stored in the storage unit 150. In step S205, a predetermined number of bytes of the first secure checksum SC1 can be stored. For example, "ED56716F3B78D874" which is first 8 bytes of the first secure checksum SC1 can be stored in the storage unit 150.

In step S206, the crypto unit 140 encrypts the data D to be an encrypted data D' according to the first key KEY1; or the crypto unit 140 encrypts an authentication data AD to be an encrypted authentication data AD'.

Please referring to FIG. 3, the first personal identification number PIN1 and the first key KEY1 are not stored in the storage unit 150. Even if the hacker gets the data carrier 300, 300', he cannot obtain the first personal identification number PIN1 and the first key KEY1. Therefore, the encrypted data D' will not be decrypted by the hacker.

Figure 4:
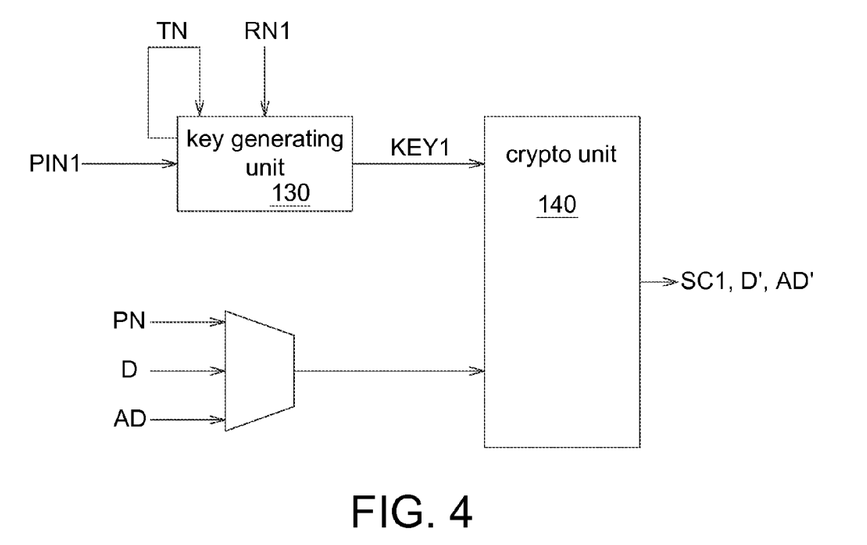
FIG. 4 shows another embodiment of FIG. 3.

Please referring to FIG. 4, another embodiment of FIG. 3 is shown. In another embodiment, the first key KEY1 can be obtained according to a temporary number TN and the first random number RN1. The temporary number TN is obtained according to the first personal identification number PIN1 by performing a many-to-one algorithm or a one-to-one algorithm. For example, the temporary number TN can be obtained by performing a Hash algorithm or identical to the first personal identification number PIN1, i.e. the embodiment of FIG. 3.

Figure 5:
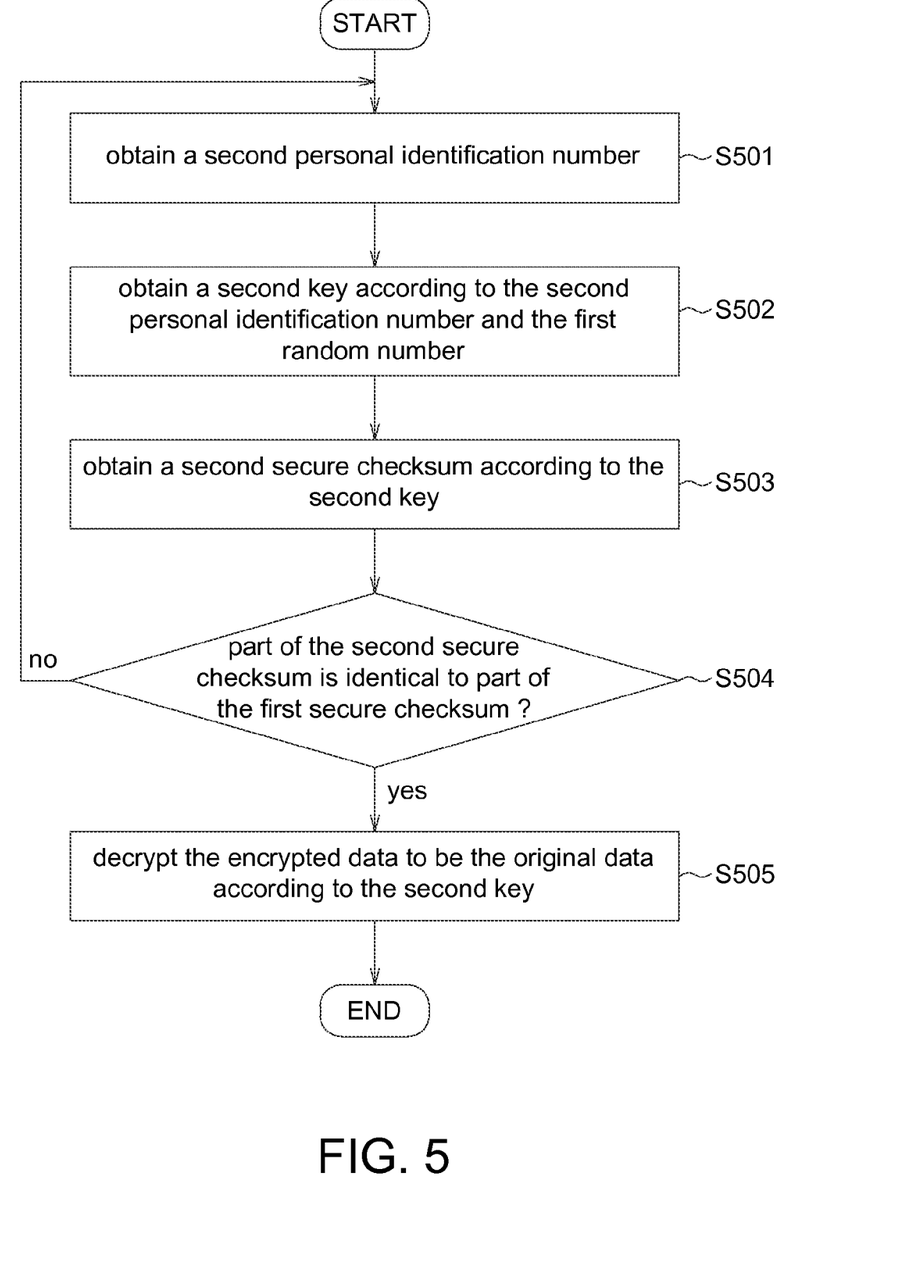
FIG. 5 shows a flow chart of the decryption procedure of the data securing method.
Figure 6:
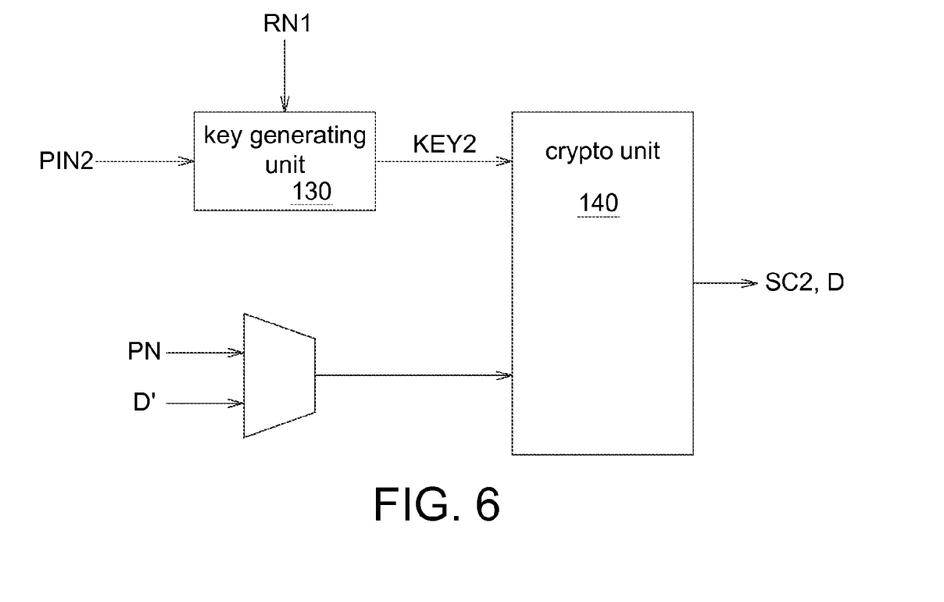
FIG. 6 shows a logic diagram of FIG. 5.

Please referring to FIGS. 5 and 6, FIG. 5 shows a flow chart of the decryption procedure of the data securing method, and FIG. 6 shows a logic diagram of FIG. 5. In step S501, the inputting unit 110 obtains a second personal identification number PIN2 from a user.

In step S502, the key generating unit 130 obtains a second key KEY2 according to the second personal identification number PIN2 and the first random number RN1. In step S503, the second key KEY2 can be obtained by performing a many-to-one algorithm or a one-to-one algorithm. The many-to-one algorithm may be an exclusive-OR operation. The one-to-one algorithm may be a linear function algorithm. Taking the exclusive-OR operation as an example, the second key KEY2 can be obtained by the following equation (3).

$$KEY2=PIN2\oplus RN1 \quad (3)$$

In step S503, the crypto unit 140 obtains a second secure checksum SC2 according to the second key KEY2. In step S503, the second secure checksum SC2 can be obtained according to the second key KEY2 and the predetermined number PN described in the step S204, such as "0X00 . . . 00". The second secure checksum SC2 can be obtained by performing a many-to-one algorithm or a one-to-one algorithm. For example, the second secure checksum SC2 can be obtained by performing Hash algorithm, a symmetric encryption algorithm, an asymmetric algorithm or a CRC32 algorithm. For example, the second secure checksum SC2 can be obtained by the following equation (4).

$$AES\_ENC(KEY2,PN)=SC2 \quad (4)$$

In step S504, the crypto unit 140 determines whether part of the second secure checksum SC2 is identical to part of the first secure checksum SC1. If part of the second secure checksum SC2 is identical to part of the first secure checksum SC1, then the process proceeds to step S505; if part of the second secure checksum SC2 is not identical to part of the first secure checksum SC1, then the process proceeds to step S501.

In step S505, the crypto unit 140 decrypts the encrypted data D' to be the original data D according to the second key KEY2.

Please referring to FIG. 6, even if the first personal identification number PIN1 and the first key KEY1 are not stored in the storage unit 150, the user still can take out the original data D by correctly inputting the second personal identification number PIN2.

Figure 7:
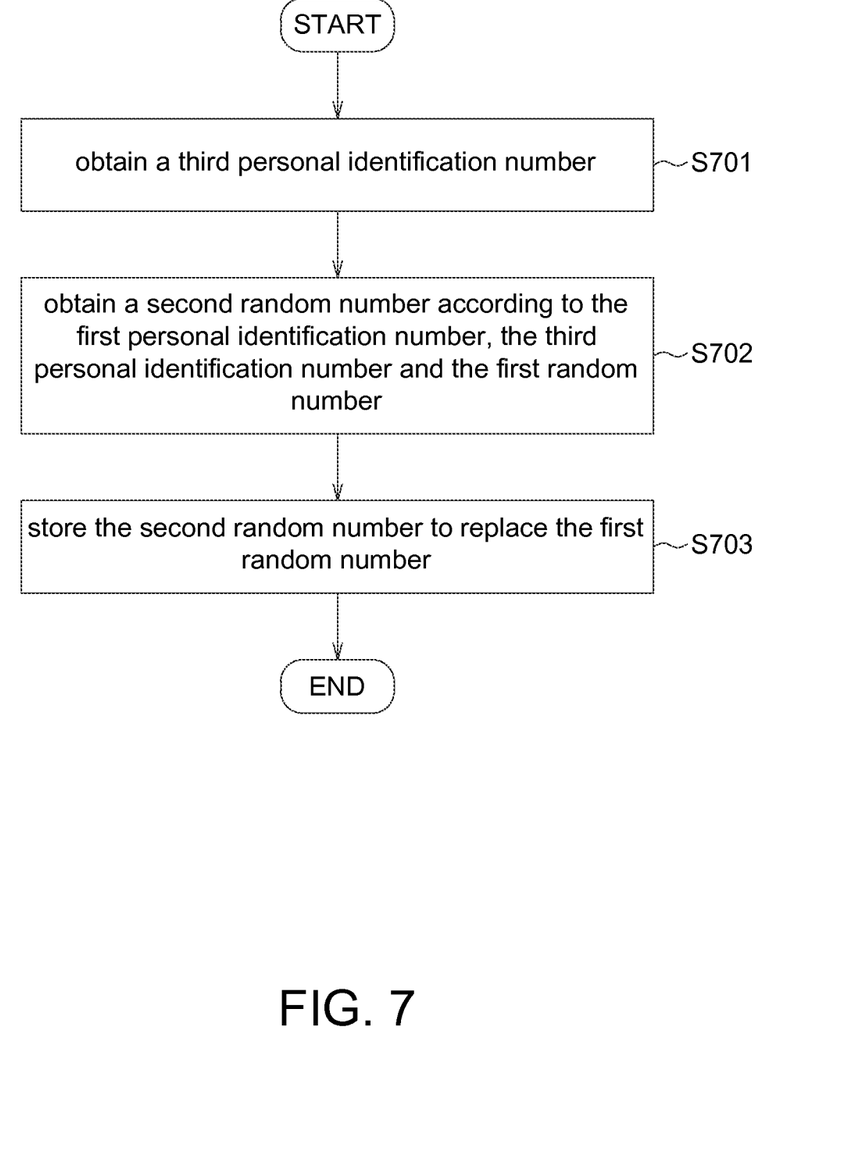
FIG. 7 shows a flow chart of the personal identification number changing procedure of the data securing method.
Figure 8:
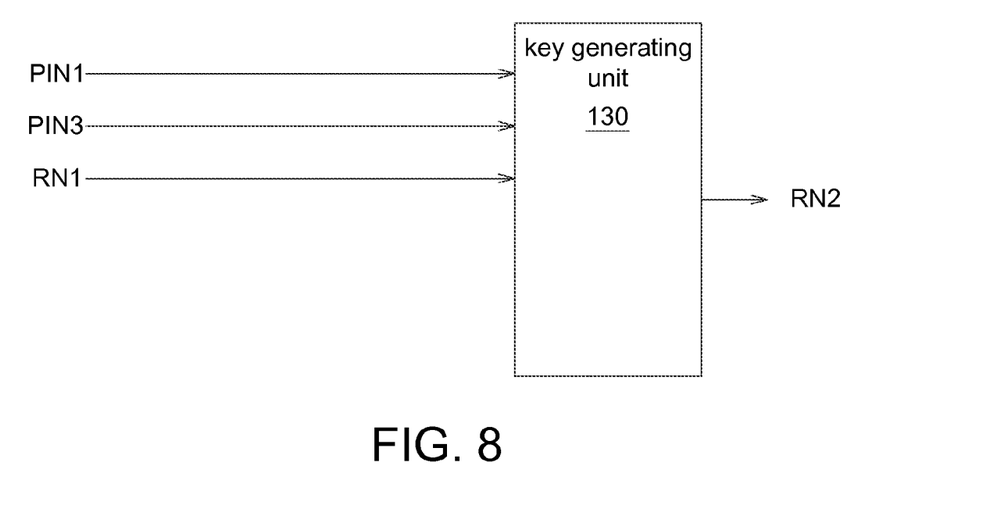
FIG. 8 shows a logic diagram of FIG. 7.

Please referring to FIGS. 7 and 8, FIG. 7 shows a flow chart of the personal identification number changing procedure of the data securing method, and FIG. 8 shows a logic diagram of FIG. 7. In step S701, the inputting unit 110 obtains a third personal identification number PIN3 from a user.

In step S702, the key generating unit 130 obtains a second random number RN2 according to the first personal identification number PIN1, the third personal identification number PIN3 and the first random number RN1. In step S203, referring to equation (5), the first key KEY1 can be obtained according to the first personal identification number PIN1 and the first random number RN1 by performing a logic operation or an algorithm. In the equation (5), the symbol "@" represent a logic operation or an algorithm. Referring to equation (5), the first key KEY1 can also be obtained according to the third personal identification number PIN3 and a second random number RN2 by performing the same logic operation or algorithm.

$$KEY1=PIN1@RN1=PIN3@RN2 \quad (5)$$

According to equation (5), the second random number RN2 can be obtained by the following equation (6).

$$RN2=PIN1@RN1@PIN3 \quad (6)$$

In step S703, the second random number RN2 is stored in the storage unit 150 to replace the first random number RN1.

Afterward, the user can input the third personal identification number PIN3 and then take out the original data D.

As illustrated in FIG. 8, when the user replaces the first personal identification number PIN1 by the third personal identification number PIN3, the first key KEY1 does not changed. Therefore, the encrypted data D' is not needed to be decrypted and encrypted again.

Moreover, according to another aspect, please referring to FIG. 10, when a smart phone APP links NFC SE or other hardware, the first key KEY1 obtained by the present method can be used as an authentication key of the NFC SE or other hardware.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A data securing method, comprising a personal identification number changing procedure used in conjunction with an encryption procedure for encrypting a data and a decryption procedure for decrypting the encrypted data, the method comprising:

the encryption procedure including:
receiving a first personal identification number by an inputting hardware device;
generating a first random number by a random number generating hardware device;
creating a first key by a key generating hardware device by performing an exclusive-OR (XOR) operation on the first personal identification number and the first random number;
creating a first secure checksum by a crypto hardware device according to the first key;
storing the first random number and part of the first secure checksum by a storage hardware device; and
encrypting the data by the crypto hardware device with the first key;

the personal identification number changing procedure including:
receiving a second personal identification number;
creating a pseudo-random number by performing an XOR operation on the first personal identification number, the second personal identification number, and the first random number; and
replacing, by the storage unit hardware device, the stored first random number with the pseudo-random number;

the decryption procedure including:
receiving a third personal identification number by the inputting hardware device, wherein the first personal identification number is different from the third personal identification number;
creating a second key by the key generating hardware device by performing an exclusive-OR (XOR) operation on the third personal identification number and the pseudo-random number;
creating a second secure checksum by the crypto hardware device according to the second key;
determining whether part of the second secure checksum is identical to the part of the first secure checksum; and
decrypting the encrypted data with the second key if the part of the second secure checksum is identical to the part of the first secure checksum.

2. The data securing method according to claim 1, wherein in the step of generating the first random number, the first random number is generated by one of a host and a data carrier.

3. The data securing method according to claim 1, wherein in the step of creating the first secure checksum, the first secure checksum is created according to the first key and a predetermined number.

4. The data securing method according to claim 1, wherein in the step of creating the first secure checksum, the first secure checksum is created by performing a one-to-one algorithm.

5. The data securing method according to claim 1, wherein in the step of storing the first random number and the part of the first secure checksum, a predetermined number of bytes of the first secure checksum are stored.

6. The data securing method according to claim 1, wherein in the step of creating the first key, the first key is created according to a temporary number and the first random number, and the temporary number is created according to the first personal identification number.

7. The data securing method according to claim 1, wherein in the step of creating the first secure checksum, the first secure checksum is created by performing a many-to-one algorithm.

8. A data securing system, comprising:
an inputting hardware device for inputting a first personal identification number, a second personal identification number and a third personal identification number, wherein the first personal identification number is different from the third personal identification number;
a random number generating hardware device for generating a first random number and creating a pseudo-random number by performing an exclusive-OR (XOR) operation on the first personal identification number, the second personal identification number and the first random number;
a key generating hardware device for creating a first key by performing an exclusive-OR (XOR) operation on the first personal identification number and the first random number and creating a second key by performing an exclusive-OR (XOR) operation on the third personal identification number and the pseudo-random number;
a crypto hardware device for creating a first secure checksum according to the first key and encrypting a data according to the first key, and further creating a second secure checksum according to the second key; and
a storage hardware device for storing the first random number, part of the first secure checksum and the encrypted data;
wherein the first random number is replaced by the pseudo-random number, and the crypto hardware device further determines whether part of the second secure checksum is identical to the part of the first secure checksum and decrypts the encrypted data according to the second key if the part of the second secure checksum is identical to the part of the first secure checksum.

9. The data securing system according to claim 8, wherein the random number generating hardware device is configured in one of a host and a data carrier.

10. The data securing system according to claim 8, wherein the key generating hardware device creates the first key according to a temporary number and the first random number, and key generating hardware device creates the temporary number according to the first personal identification number.

11. The data securing system according to claim 8, further comprising:
a crypto hardware device for performing an authentication procedure according to the first key.

12. The data securing system according to claim 8, wherein the crypto hardware device creates the first secure checksum according to the first key and a predetermined number.

13. The data securing system according to claim 8, wherein the crypto hardware device creates the first secure checksum by performing a one-to-one algorithm.

14. The data securing system according to claim 8, wherein the storage hardware device stores a predetermined number of bytes of the first secure checksum.

15. The data securing system according to claim 8, wherein the crypto hardware device creates the first secure checksum by performing a many-to-one algorithm.

16. A data carrier, for storing and encrypting a data, wherein a first secure checksum is created according to a first key, a second secure checksum is created according to a second key, the data is encrypted according to the first key, and the data carrier comprises:
a random number generating hardware device for generating a first random number and creating a pseudo-random number by performing an exclusive-OR (XOR) operation on a first personal identification number, a second personal identification number, and the first random number, wherein the first personal identification number is different from a third personal identification number;
a storage hardware device for storing the first random number, part of the first secure checksum and the encrypted data, and for replacing the first random number with the pseudo-random number;
a key generating hardware device for creating the first key by performing an exclusive-OR (XOR) operation on the first personal identification number and the first random number and creating the second key by performing an exclusive-OR (XOR) operation on the third personal identification number and the pseudo-random number; and
a crypto hardware device for determining whether part of the second secure checksum is identical to part of the first secure checksum and decrypting the encrypted data according to the second key if the part of the second secure checksum is identical to the part of the first secure checksum.

17. The data carrier according to claim 16, wherein the first random number is generated by one of a host and the data carrier.

18. The data carrier according to claim 16, wherein the first secure checksum is created according to the first key and a predetermined number.

19. The data carrier according to claim 16, wherein the first secure checksum is created by performing a one-to-one algorithm.

20. The data carrier according to claim 16, wherein the storage hardware device stores a predetermined number of bytes of the first secure checksum.

21. The data carrier according to claim 16, wherein the first key is created according to a temporary number and the first random number, and the temporary number is created according to the first personal identification number.

22. The data carrier according to claim 16, wherein the first secure checksum is created by performing a many-to-one algorithm.

23. A non-transitory computer-readable storage device with computer-executable instructions stored thereon that, when executed by one or more computer processors, cause the one or more computer processors to perform procedures comprising:

an encryption procedure including:
receiving a first personal identification number by an inputting hardware device;
generating a first random number by a random number generating hardware device;
creating a first key by a key generating hardware device by performing an exclusive-OR (XOR) operation on the first personal identification number and the first random number;
creating a first secure checksum by a crypto hardware device according to the first key;
storing the first random number and part of the first secure checksum by a storage hardware device; and
encrypting the data by the crypto hardware device with the first key;

a personal identification number changing procedure including:
receiving a second personal identification number;
creating a pseudo-random number by performing an exclusive-OR (XOR) operation on the first personal identification number, the second personal identification number, and the first random number; and
replacing, by the storage hardware device, the stored first random number with the pseudo-random number;

a decryption procedure including:
receiving a third personal identification number by the inputting hardware device, wherein the first personal identification number is different from the third personal identification number;
creating a second key by the key generating hardware device by performing an exclusive-OR (XOR) operation algorithm on the third personal identification number and the pseudo-random number;
creating a second secure checksum by the crypto hardware device according to the second key;
determining whether part of the second secure checksum is identical to the part of the first secure checksum; and
decrypting the encrypted data with the second key if the part of the second secure checksum is identical to the part of the first secure checksum.

\* \* \* \* \*